Patented Aug. 31, 1948

2,448,357

UNITED STATES PATENT OFFICE 2,448,357

PANEL FACING

Kenneth A. Craig and Richard J. Auchter, Appleton, Wis., assignors to Paper Patents Company, Neenah, Wis., a corporation of Wisconsin No Drawing. Application November 29, 1945, Serial No. 631,783

4 Claims. (Cl. 154—138)

The invention relates to improvements in panel facings and has its chief application in connection with providing a durable outer facing or finish sheet adapted to be adhesively applied to the exterior of articles such as panels or structures made of plywood or other materials. The invention will be described in connection with the manufacture of outer face sheets for boards or laminations of plywood which enter into the construction of packaging cases, building walls or other structures for which plywood may be conveniently used.

It has been found desirable from the standpoint of durability, resistance to wear and atmospheric agencies, as well as from the standpoint of structural strength and resistance to breakage or abrasion, to cover the surface of such panels with a layer of material such as paper and impregnated with some type of resin, which by the use of heat and pressure, can be converted into a permanent and durable skin covering the surface of the plywood.

The outer surface of such facing sheet, from the standpoint of appearance and durability and mechanical strength, should contain a relatively high proportion of resin, so that, in setting the resin, a planished, dense, tough and waterproof skin results. On the other hand, if the inner surface of the face layer is of the same character as the outer surface or skin, it is exceedingly difficult to unite the face layer adhesively to the surface of the plywood and obtain a bond of the required strength to resist any delaminating tendency.

The purpose of the present invention is to provide a panel facing element in the form of a sheet having a durable permanent finish on the side or face of the sheet which is to become the exterior of the panel and at the same time to provide on the other side of the sheet a surface which is compatible with, and will form an adequate bond with, the glue or other adhesive which is employed to secure the facing to the panel.

General method

In practicing the invention, we produce a facing made up of two separately formed layers, each made of paper. The outer or face layer is impregnated or otherwise loaded with a resin of a type and consistency which, when cured by heat and pressure, will poylmerize and form a relatively dense solid mass throughout the entire thickness of the layer. The other layer, which may be termed the anchor layer, is coated on one side with a type of resin which when polymerized by heat and pressure will not impregnate the layer of paper to any considerable extent, thus leaving the uncoated surface of the anchor sheet in substantially its original relatively rough condition, substantially free from polymerized resin.

The resin used to coat the anchor layer should not only be of a non-impregnating type, but should be sufficiently compatible with the resin carried by the outer layer so that, when the two elements are brought together into contact with each other and subjected to the necessary heat and pressure to polymerize and densify the resins, the two contacting resins will unite and bond together, while, at the same time, the resin coat on the anchor sheet will serve as a baffle or impervious diaphragm which will prevent the resin in the face sheet from penetrating into and through the anchor sheet.

In the manufacture of these materials, it is customary to assemble the layers or sheets in the form of books. A plurality of these books are assembled in the press while between the books are interposed what are termed "caul plates," usually metal plates having polished suitably lubricated surfaces, so that the facing will receive a like polished surface and will not stick to the caul plate.

A single facing may be made by pressing together a single outer layer and a single inner layer coated on one side only, or, if desired, two of such books each book consisting of an anchor layer and a face layer can be placed back to back with the uncoated surfaces of the anchor layers in contact with each other, so that two panel facings may be made at a time.

However, from the standpoint of economy of manufacture and also because of the somewhat superior characteristics of the anchoring surface thereby produced, it is preferred to make a duplex anchor sheet, i. e. of a paper base having double the thickness required for a single anchor sheet, and coat the same on both sides so that it can be interposed between two of the outer face elements. Subsequently, after the required press operation, the composite sheet can be easily split mechanically so as to produce two finished facings.

Example No. 1

An anchor sheet is made on the paper machine from a base stock containing about 100% of wet sulphite pulp. After the sheet is dried, it is coated on one side with a solution of a high viscosity, thermosetting, urea formaldehyde resin. The liquid coating contains 50% solids and should have a viscosity of about 4.7 poises at 25° C. This resin is of such character that it will retain a relatively high viscosity at the setting temperature and will not penetrate into the body of the sheet to any appreciable extent. The sheet is dried to a volatile content of 5 to 7%. When so dried, the sheet should contain about 30% of the urea formaldehyde resin, and its total weight may be from 30 to 40 lbs. per ream of 3,000 square feet.

The face sheet furnish may be 100% wet sulphite pulp, or may contain 75% of wet sulphite pulp and 25% of soda pulp. It is impregnated with a water soluble thermosetting, phenol-formaldehyde resin of any type which is well adapted for impregnating paper. After impregnating with said resin and after drying to a volatile content of 7.9%, the sheet should contain about 30% of resin and have a total weight of about 65 lbs. per ream of 3,000 sq. ft.

In this case, a book is made by assembling the anchor sheet with one or more of the face sheets so that the coated side of the anchor sheet is in contact with the face layer. Such books and the usual caul plates are alternately stacked in an opening between the platens of the press, about ten books being contained in each opening. The press is then closed, the heat and pressure turned on, and a temperature of about 325° F. and pressure of 800 lbs. per square inch is maintained for about twenty minutes. The platens are then cooled if desired by circulating cold water for twenty minutes prior to release of the pressure. The books are then removed from between the caul plates.

The finished composite product consisting of a facing layer and an anchor layer, firmly bonded together to form an integral sheet, may then be securely adhesively united to the sanded surface of a plywood panel by using any usual type of cold setting urea-formaldehyde glue employing a pressure of about 160 lbs. per square inch for about three hours, at about 150° F.

*Example No. 2*

In this case, two of the above-described books made in the same manner were placed with the uncoated surfaces of the anchor sheets in contact with each other. In other respects, the operation was carried on as above described in connection with Example No. 1. This operation resulted in the production of two of the finished composite facing sheets instead of only one, for each space between caul sheets.

*Example No. 3*

In this case, the procedure was as stated in connection with Example No. 1 except that instead of making the face sheet of a single web of sulphite pulp, we employ two webs made of rag scrap containing 43% resin in the outer web and 38% resin in the inner web, the resin consisting of any standard alcohol-soluble phenol-formaldehyde impregnating type.

*Example No. 4*

In this example, the procedure was as described in the case of Example No. 2, except that in place of using two separate anchor sheets, we employed a single 65-lb. sheet or layer made from a furnish containing 75% wet sulphite pulp and 25% pulp and coated on each side. This anchor layer was interposed between two of the facing layers formed as any of the preceding examples, and the books so formed were interposed between caul sheets and cured in the manner described in connection with Example No. 1.

In this case, it was necessary to split the cured lamination intermediate the thickness of the anchor layer, which operation can readily be accomplished by starting the operation with a sharp knife whereupon the composite structure can be readily split into two separate facings each having a finished surface of smooth wear-resistant resin, while the other surface is free from resin and relatively rough as to its surface texture.

In this case, the splitting and tearing of the duplex structure into two separate finished facings produces a very desirable rough surface which takes the glue even better than in the case of Example No. 1, because the caul plate has a smoothing or ironing effect on the outer surface of the anchor sheet and therefore does not give quite as desirable a surface for taking the glue as in the case of the rougher surface resulting from the splitting operation.

We claim:

1. The improved process for manufacturing facing sheets having on one side a surface supply of thermoset resin forming a permanent durable finished surface and on the other side a surface relatively free from resin and of such texture that it can be adhesively united to the outer surface of a base member such as a wooden panel, which comprises the steps of loading a face layer of paper with a thermosetting, aldehyde resin of a type which will impregnate paper, coating a side of an anchor layer of paper with a high viscosity, thermosetting, aldehyde resin of a type which will surface coat but will not impregnate paper, assembling said layers together with the coated surface of the anchor layer in contact with a surface of the resin-loaded face layer, and then subjecting the assembly to combined heat and pressure so as to set the resin in the assembly and thereby bond together the surfaces of the two layers and at the same time form a durable finish on the outer surface of the face layer, while the resin coating on the anchor layer prevents penetration of resin through the thickness of the anchor layer.

2. The improved process of manufacturing a pair of facing sheets each having on one side a supply of thermoset resin forming a permanent durable finished surface and on the other side a surface relatively free from resin and of such texture that it can be adhesively united to the outer surface of a base member such as a wooden panel, which comprises the steps of loading a pair of face layers of paper with a thermosetting, aldehyde, resin of a type which will impregnate paper, coating both sides of a duplex anchor layer of paper with a high viscosity, thermosetting, aldehyde resin of a type which will surface coat but will not impregnate paper, forming a book by interposing the duplex anchor layer between the two face layers, the resin of said anchor layer coatings being of a type which, when subjected to heat and pressure, will unite with the resin carried by the face layers, but will not permit penetration of resin into the center of the duplex anchor layer, then subjecting said book to combined heat and pressure so as to set the resin in the book and thereby to bond the surfaces of the duplex anchor layer to the inner surfaces of the outer face layers and to form a durable finish on the outer surfaces of the face layers, and then mechanically splitting the book intermediate said bonds so as to produce the desired pair of finished facing sheets.

3. A multi-layer sheet product adapted to be adhesively united to the outer surface of a base member, such as a wooden panel, to provide a facing therefor, said product comprising a face layer of paper uniformly impregnated with a thermoset, phenol-aldehyde resin, cured in situ to provide a permanent, durable, finished surface on the outer surface of said face layer, and an anchor layer which is also of paper and which is joined to the inner surface of said face layer by a layer of a thermoset, urea-aldehyde resin of a type which, when uncured, has a high viscosity and will surface coat, but will not impregnate, paper, said anchor ply being substantially free from resin at the outer surface thereof.

4. A multi-layer sheet product which can be split along a central layer thereof to provide a pair of facing sheets, each having on one side a supply of thermoset resin forming a permanent, durable, finished surface, and on the other side, a surface relatively free from resin and of such texture that it can be adhesively united to the outer surface of a base member, such as a wooden panel, said product comprising two surface layers of paper, each of which layers is impregnated with a phenol-aldehyde resin, cured in situ to provide permanent and durable finished surfaces on each side of said product, a central layer of paper which is substantially free from resin impregnation, and means joining said central layer to said resin impregnated, surface layers comprising a layer of a thermoset, urea-aldehyde resin.

KENNETH A. CRAIG.
RICHARD J. AUCHTER.

REFERENCES CITED

The following references are of record in the file of this patent:

UNITED STATES PATENTS

| Number | Name | Date |
| --- | --- | --- |
| 2,118,549 | Cochrane, Jr. | May 24, 1938 |
| 2,343,740 | Birmingham | May 7, 1944 |